United States Patent [19]

Cross

[11] 4,093,339
[45] June 6, 1978

[54] METHOD AND APPARATUS FOR FABRICATING OPTICAL WAVEGUIDE GRATING RESONATORS

[75] Inventor: Peter Stanley Cross, Middletown, N.J.

[73] Assignee: Bell Telephone Laboratories, Incorporated, Murray Hill, N.J.

[21] Appl. No.: 800,651

[22] Filed: May 26, 1977

[51] Int. Cl.² .................. G02B 5/18; G02B 5/32; G03H 1/04
[52] U.S. Cl. .................. 350/3.70; 350/96.19
[58] Field of Search ............ 350/3.5, 162 R, 96 WG, 350/96 C

[56] References Cited

U.S. PATENT DOCUMENTS

| | | | |
|---|---|---|---|
| 3,622,220 | 11/1971 | Kogelnik | 350/3.5 |
| 3,977,763 | 8/1976 | Ostrowsky | 350/3.5 |

FOREIGN PATENT DOCUMENTS

| | | | |
|---|---|---|---|
| 1,088,838 | 10/1967 | United Kingdom | 350/162 R |

OTHER PUBLICATIONS

Mollenauer et al., *Applied Optics*, vol. 16, No. 3, Mar. 1977, pp. 555–557.
Shank et al., *Applied Physics Letters*, vol. 23, No. 3, Aug. 1973, pp. 154–155.
Haus et al., *IEEE Jour. of Quantum Electronics*, vol. QE-12, No. 9, Sep. 1976, pp. 532–539.
Garvin et al., *Applied Optics*, vol. 12, No. 3, Mar. 1973, pp. 455–459.
Brown et al., *Applied Optics*, vol. 5, No. 6, Jun. 1966, pp. 967–969.
Hauk et al., *Optik*, vol. 15, No. 5, May 1958, pp. 275–277.

*Primary Examiner*—Ronald J. Stern
*Attorney, Agent, or Firm*—Daniel D. Dubosky

[57] ABSTRACT

A helium cadmium laser generates an output beam of radiation which is coupled through a spatial filter and beam expander to a beam splitter which in turn provides two enlarged beams of coherent radiation of approximately equal power. Two highly reflective mirrors are used to direct the two beams such that the two beams interfere and create the usual interference pattern in a positive photoresist layer covering an optical substrate. A thin sheet of high index glass is held by two blocks of quartz in a position adjacent to the photoresist layer and oriented such that a part of each beam of coherent radiation is caused to pass through the high index glass before interfering with the other beam on the photoresist layer. As a result, a grating having a quarter wavelength step or discontinuity in the middle of the grating is fabricated in the photoresist. The photoresist pattern is then transferred to the optical waveguide by ion-beam milling. Several high index sheets can be positioned so as to create more than a single quarter wavelength step.

7 Claims, 6 Drawing Figures

METHOD AND APPARATUS FOR FABRICATING OPTICAL WAVEGUIDE GRATING RESONATORS

BACKGROUND OF THE INVENTION

The invention relates to optical waveguide gratings and more particularly to optical waveguide gratings having a step or discontinuity in the periodicity of the grating.

As pointed out by H. A. Haus and C. V. Shank in the article entitled "Antisymmetric Taper of Distributed Feedback lasers", *IEEE Journal of Quantum Electronics*, Vol. QE—12, No. 9, Dec. 19, 1976, pages 532-539, a distributed feedback laser with no mode degeneracy can be created by using an optical waveguide grating having a quarter wavelength step or discontinuity in the middle of the grating. This type of distributed feedback laser is also described in their copending patent application entitled "Distributed Feedback Devices with Perturbations Deviating from Uniformity for Removing Mode Degeneracy", filed Feb. 7, 1976, Ser. No. 654,339. As pointed out by Messrs. Haus and Shank, this type of distributed feedback laser is preferable in that the output wavelength is entirely predictable unlike the normal distributed feedback laser having a grating with regular periodicity throughout.

One technique presently known to the art for creating an optical waveguide grating is described by G. C. Bjorklund, L, F. Mullenauer, and W. J. Tomlinson in their copending application entitled "Apparatus for Piecewise Generation of Grating-Like Pattern", filed Jan. 12, 1976, Ser. No. 648, 326. This apparatus is also described in their article entitled "Piecewise Interferometric Generation of Precision Gratings", by L. F. Mullenauer and W. J. Tomlinson, *Applied Optics*, Vol. 16, No. 3, March 1977, pages 555-557. In the Bjorklund et al apparatus a grating can be generated in a piecewise fashion by moving the interference pattern across an optical substrate having a photoresist layer. To adopt this technique so as to produce a step or discontinuity in the grating would require the mechanical insertion of a 180° phase shifter into the path of one of the coherent beams used to create the grating. This could only be done after the interference pattern has been moved so as to not overlap a previously created pattern. The precise movement of the two coherent beams and mechanical insertion of the phase shifter are believed to be formidable problems in the creation of an optical waveguide grating having a quarter wavelength step in the structure with minimum separation between the two segments of the grating.

BRIEF SUMMARY OF THE INVENTION

A primary object of the present invention is to fabricate an optical waveguide grating having a quarter wavelength step in the grating without requiring mechanical insertion of 180° phase shifter during any step of the process.

Another object of the present invention is to create an optical waveguide grating with a minimum separation between the two segments of the grating separated by the quarter wavelength step.

These objects and others are provided by the present inventon wherein two coherent beams are generated by passing the output from a single laser through an arrangement of a beam splitter and mirrors, and a portion of each one of the two beams is caused to pass through a sheet of high index medium before that portion of the beam interferes with the other beam on the photoresist layer of an optical waveguide substrate. In the embodiment described in the present specification the sheet of high index medium is a sheet of high index glass which is supported in a position substantially perpendicular to the optical waveguide substrate and is supported in this position by being sandwiched between two blocks of fused quartz which abut the optical waveguide substrate. The high index glass introduces a phase shift of $\pm \pi/2$ or $\pm 90°$ into the radiaton passing through it. As a result, the interference pattern created on one side of the thin sheet of high index medium is created by one of the beams interfering with the second beam after the second beam has been phase shifted by 90°, and the interference pattern created on the other side of the high index medium is created by the second beam interfering with the first beam after the first beam has been phase shifted by 90°. The resulting interference pattern which is created in the photoresist layer is developed, and an optical waveguiding grating is created on the substrate through the well known technique of ion beam micromachining. This resulting grating has a quarter wavelength step or discontinuity at a location correspondent to the position of the sheet of high index glass.

It is a feature of the present invention that several tandem optical resonators can be created by causing the optical beams to be coupled through a plurality of high index sheets, each one of which is positioned substantially perpendicular to the optical waveguide substrate and is oriented such that it is parallel to he adjacent high index sheets.

BRIEF DESCRIBTION OF THE DRAWINGS

The invention will be more readily understood after reading the following detailed description in conjunction with the drawings wherein.

DETAILED DESCRIPTION

Figure 1:
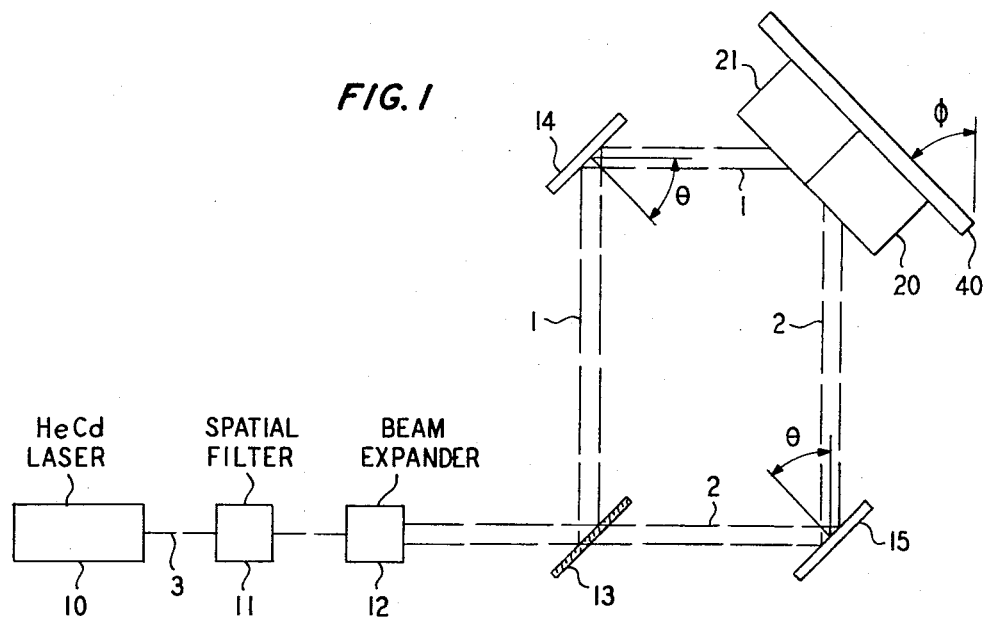
FIG. 1 is a block diagram, partially in pictorial, of an apparatus constructed to utilize the present invention.

In FIG. 1, a helium cadmium laser 10 generates a coherent beam 3 of radiation (of approximately 10 milliwatts) at a wavelength of 3250 A. The coherent beam of radiation is coupled to a spatial filter 11 which filters the beam so as to provide at its output a single Gaussian mode of radiation. This single mode of radiation is coupled to a beam expander 12 which enlarges the beam to a diameter of 1 to 10 mm., the particular diameter chosen being dependent on the size of grating to be fabricated. The enlarged beam from beam expander 12 is coupled to a beam splitter 13 which reflects a portion of the power so as to generate a coherent beam 1 and transmits the remainder of the power so as to generate a second coherent beam 2.

Coherent beams 1 and 2 are reflected by mirrors 14 and 15, respectively, such that beams 1 and 2 are directed so as to interfere in a predetermined spatial plane. This predetermined spatial plane corresponds to the plane in hich beams 1 and 2 will generate the usual interference pattern necessary to create an optical grating in a photoresist layer. The plane in which beams 1 and 2 interfere is not simply determined in FIG. 1 by the line of sight intersection, since beams 1 and 2 are coupled to fused quartz blocks 21 and 20, respectively. In passing into this more dense medium, beams 1 and 2 are refracted and after refraction interfere in a predetermined spatial plane which is coincident with a positive photoresist layer (e.g., Shipley AZ1350B) deposited on the surface of an optical substrate 40.

The predetermined spatial plane at which the interference pattern is created in dependent on the orientation of mirrors 14 and 15. Each of these mirrors is oriented so as to present an incident angle $\theta$ to their respective incoming beam of radiation. The angle $\theta$ can be changed for each of the mirrors 14 and 15 in order to change the periodicity of the grating being fabricated. As is well known to those skilled in the art, this change of periodicity also requires a repositioning of the optical substrate 40 so as to ensure that the interference patter is created in the photoresist layer. The integral structure including blocks 20 and 21 and optical substrate 40 can also be rotated about an axis which is perpendicular to beams 1 and 2 in a direction indicated by the angle $\phi$ in FIG. 1. This structure is rotated for reasons to be given hereinafter in connection with he discussion of the construction of the block structure using optical quartz blocks 20 and 21 in FIG. 1.

Figure 2:
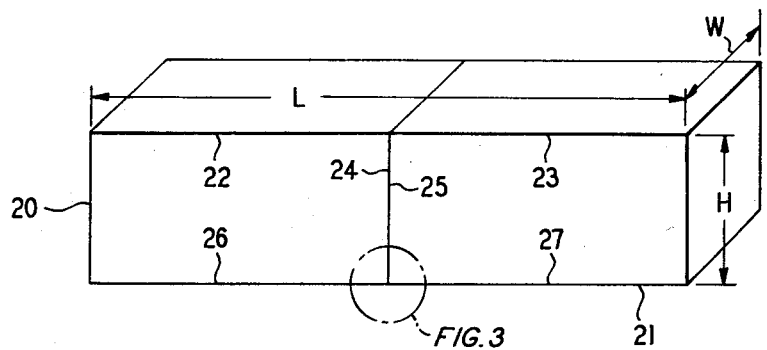
FIG. 2 is a diagram of two blocks of fused quartz separated by a sheet of high index glass used in the practice of the present invention.

A separate pictorial view of the optical quartz blocks 20 and 21 is shown in FIG. 2. In the present embodiment, each of the blocks has height H and width W equal to 1 inch and a length equal to 2 inches. Blocks 20 and 21 are cemented to a thin in-between high index medium to be described hereinafter, thereby creating an overall integrated block length L equal to about 4 inches. This integrated block is made by first taking individual quartz blocks and polishing the optical surfaces designated as 22 through 27 in FIG. 2. These highly polished surfaces must be as flat as possible to minimize beam wavefront distortion.

A thin sheet of high index glass measuring one inch by one inch should be optically polished on both 1 inch by 1 inch surfaces wth a minimum wedge angle. Schott glass types LAK 8 or LAK 10 are acceptable for this high index glass. Subsequent to polishing, the thin sheet of high index glass is cemented using untraviolet (uv) transmitting glue to the highly polished 1 inch by 1 inch surface on either one of the blocks 20 or 21. This sheet of high index glass is then ground using lens grinding techniques until the sheet has a thickness D in the range of 10 to 25 microns. A layer of uv transmitting glue is then applied to the exposed surface of the sheet of high index glass and the other block has its highly polished 1 inch by 1 inch surface cemented to this surface of the high index glass. It is to be understood that the invention is not limited to the use of this particular high index glas. In fact, an organic film such as a plastic could easily provide the necessary high index of refraction and could also be a more rugged self-supporting structure.

Figure 3:
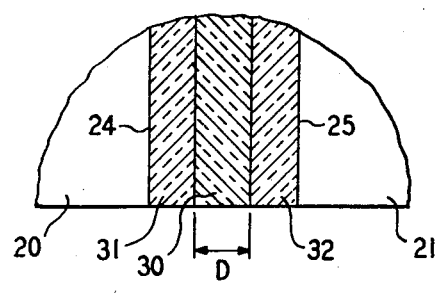
FIG. 3 is a magnified view of the interface areas between the blocks of fused quartz and high index glass.

The entire preceding operation of creating the integrated block results in a sandwich layer of the type illustrated in FIG. 3, which is an enlarged cutaway portion of the integrated block shown in FIG. 2. As indicated in FIG. 3, the highly polished surface 24 of block 20 is separated from the sheet of high index glass 30 by an ultraviolet transmitting glue 31. Similarly, optical surface 25 of block 21 is also separated from the high index glass sheet 30 by a layer of ultraviolet transmitting glue 32. The transmitting glue layers 31 and 32 must be made as thin as possible, preferably less than 25 microns, and the glue should be chosen to have an index of refraction that is as close as possible to the index of the quartz.

Figure 4:
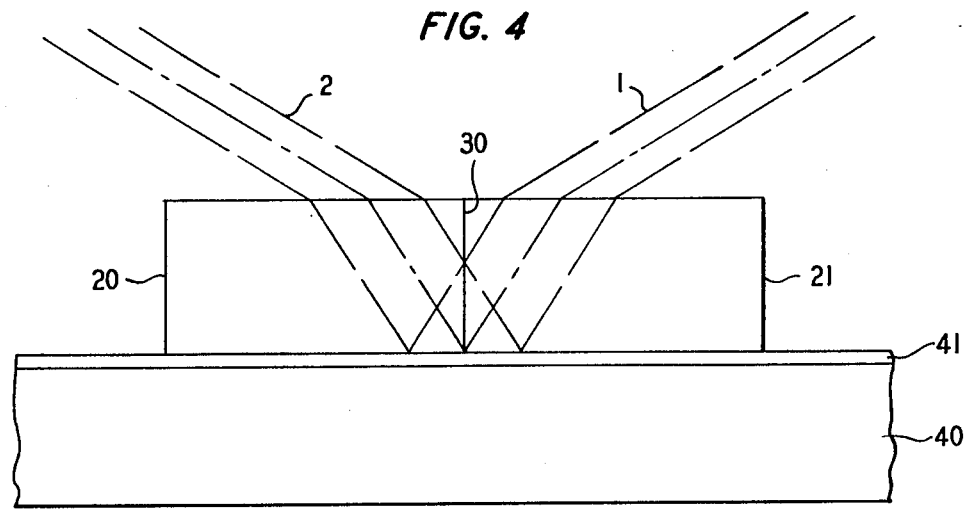
FIG. 4 is a pictorial view and ray diagram illustrating the processing of light in the apparatus shown in FIG. 1.

The positioning of the optical beams 1 and 2 with respect to th integrated block structure and the optical substrate is illustrated in FIG. 4. As indicated in FIG. 4, the block structure using quartz blocks 21 and 20 is positioned such that beams 1 and 2 impinge upon the photoresist layer 41 on both sides of the line along which the sheet of high index glass abuts the photoresist layer. Optical substrate 40 can be made from a simple glass slide that has been immersed in silver nitrate solution. In this process the silver ion exchanges place with the sodium ion of the glass ad in so doing forms a waveguiding layer on the surface of the glass slide. A photoresist layer 41 in FIG. 4 has been exaggerated in its dimension in order to illustrate its presence between the optical substrate 40 and the integrated block structure using blocks 20 and 21 and high index sheet 30.

With the block structure positioned as shown in FIG. 4, approximately one-half of each of the beams 1 and 2 passes through the high index sheet 30 before it interferes with the other beam on the photoresist layer. In passing through this sheet of high index glass, the light is subjected to a net phase change of approximately $\pm 90°$, the exact phase shift being dependent on the thickness of the high index sheet. As a result, there is a phase change of about 180° between the interference pattern created on one side of the high index sheet as compared with the interference pattern created on the other side of the high index sheet.

After exposure to the interference pattern, the photoresist layer is developed in the usual fashion and an optical grating is created on the surface of the optical substrate 40 by using the technique of ion beam micromachining. See the article entitled "Ion Beam Micromachining of Integrated Optics Components" by H. L. Garven et al in *Applied Optics*, vol. 12, No. 3, March 1973, pages 455–459.

Figure 5:
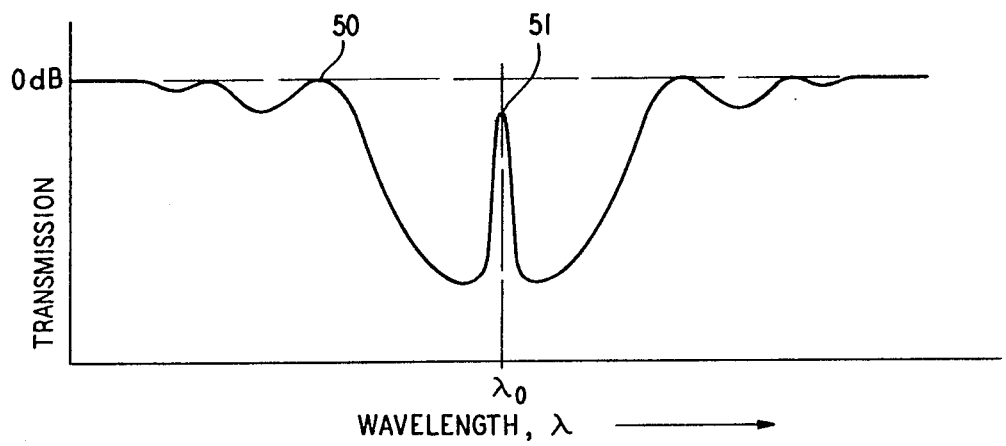
FIG. 5 is a plot of transmission versus wavelength for grating of the type that can be fabricated through use of the present invention.

If the high index sheet presents a phase shift of substantially 90° to each beam, the resulting grating will have a perfectly symmetrical transmission characteristic around the resonant wavelength of the grating. The resulting transmission grating can be checked for symmetry by connecting an optical source to one end of the waveguiding layer created in optical substrate 40 and measuring the output provided at the other end of substrate 40. If the desired one-quarter wavelength step has been created in the grating, a transmission characteristic of the type shown in FIG. 5 will result from this measurement. As shown in FIG. 5, the grating with the one-quarter wavelength step provides a narrow bandpass characteristic around a single wavelength $\lambda_0$.

The characteristic is only achieved with perfect symmetry if the high index sheet 30 provides a phase shift of $\pm 90°$ to both of the coherent beams 1 and 2. A sheet thickness which provides phase shift of other than 90° can still be caused to produce the symmetrical characteristic by rotating the sheet 30 about an axis perpendicular to beams 1 and 2 in the direction illustrated by the angle $\phi$ in FIG. 1. Such a rotation will present more of the high index medium to one of the beams while decreasing the amount of high index medium presented to the other beam. A rotation of several degrees in $\phi$ will change the amount of phase shift presented by 180°. In addition, the phase shift introduced by rotation is a nonlinear function of the change in $\phi$ and therefore the amount of phase shift added to one beam does not equal the amount of decreased phase shift in the other beam. Consequently, sheet 30 and optical substrate 40 can be rotated about an axis perpendicular to beams 1 and 2 to achieve a 180° phase shift in the created interference pattern with a rather large range of permitted thickness (D) for high index sheet 30. Sheet 30 should, of course, be kept as small in thickness (D) as possible to minimize the dimension of the introduced quarter wavelength step.

Inasmuch as it is extremely difficult to provide precisely the right thickness of high index sheet to achieve a 90° phase shift, the usual procedure of obtaining a symmetrical transmission characteristic is to expose several optical substrates at different values for the angle designated as $\phi$ in FIG. 1. A plot can then be made of the position of the bandpass peak 51 with respect to the angle $\phi$ and this plot can then be utilized to determine the precise angle at which the substrate 40 must be positioned in order to obtain a perfectly symmetrical transmission characteristic.

The type of grating which has been described thus far is useful in connection with a destributed feedback laser of the type described in the above-identified copending application of H. A. Haus et al. This type grating has a single step or discontinuity in the middle of the grating. A grating with several one-quarter wavelength steps separated from each other by a predetermined interval of regular periodic grating is useful in providing a series of tandem resonant structures at optical frequencies. This latter type grating with multiple one-quarter wavelength steps can be fabricated by using an optical block structure of the type illustrated in FIG. 6.

Figure 6:
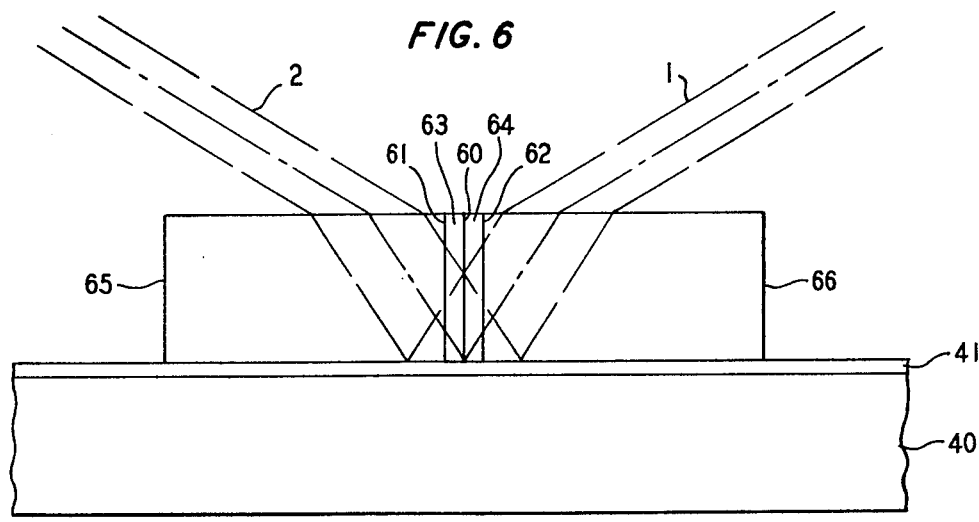
FIG. 6 is a pictorial view and light ray diagram illustrating the processing of light in an embodiment of the invention wherein a plurality of high index sheets are used to create several tandem optical waveguide gratings.

In FIG. 6, blocks 65 and 66 are similar to blocks 20 and 21 in FIG. 4, but are separated by a sandwich structure using three sheets of high index medium 60, 61 and 62 which are in turn separated from each other by smaller blocks of fused quartz designated as 63 and 64 in FIG. 6. As illustrated in FIG. 6, beams 1 and 2 in this case encounter several phase shifts of 90° in passing through the multiple layers of high index medium. The resulting grating will have one-quarter wavelength steps at positions in the grating corresponding to the lines along which sheets of high index medium 60, 61 and 62 are adjacent to the photoresist layer 41.

In the structure of FIG. 6, which uses multiple sheets of high index medium, strict control must be maintained over the thickness of the high index sheets. Consequently, mediums other than glass are preferred in this embodiment. The sheets of high index medium having accurately controlled thickness can be established on blocks of quartz by using a deposition technique with in situ measurement of the deposited film thickness.

It should be apparent to those skilled in the art that the invention is in no way limited as to the number of one-quarter wavelength steps that can be created in the grating. Additional steps simply require the placement of additional sheets of high index glass in the transmission paths encountered by beams 1 and 2.

What has been described hereinabove is an illustrative embodiment of the present invention. Numerous departures may be made by those skilled in the art without departing from the spirit and scope of the present invention. For example, means other than the fused quartz blocks can e utilized to support the sheets of high index glass. In fact, the sheets of high index glass can be made self-supporting with the proper mechanical structure. The optical quartz blocks are simply used in the present embodiment to provide a supporting structure for the high index glass.

What is claimed is:

1. Apparatus for creating an interference pattern in a photoresist layer covering an optical substrate having a waveguiding layer, said apparatus comprising laser means for developing two coherent beams of radiation that are directed so as to create an interference pattern in a predetermined area of said photoresist layer, and at least one sheet of high index medium positioned adjacent to said predetermined area substantially perpendicular to said waveguiding layer and oriented such that only a portion of each of said two beams is caused to pass through said high index sheet before that portion impinges on said photoresist layer, whereby an optical grating resonator can be fabricated in the waveguiding layer of said optical substrate.

2. Apparatus as defined in claim 1 wherein said apparatus further includes two blocks of fused quartz, and said at least one sheet of high index medium is a sheet of high index glass mechanically held in its position by being sandwiched between said two blocks of fused quartz.

3. Apparatus as defined in claim 2 wherein each one of said two blocks of fused quartz is adhered to said sheet of high index glass by a layer of ultraviolet transmitting glue.

4. Apparatus as defined in claim 1 wherein said optical substrate and said at least one sheet of high index medium are part of an integral unit that can be rotated about an axis that is perpendicular to the transmission paths of both of said two beams of coherent radiation.

5. Apparatus for creating an interference pattern as defined in claim 1 wherein said apparatus includes several sheets of high index medium positioned adjacent to said predetermined area substantially perpendicular to said waveguiding layer.

6. A method of fabricating an optical waveguide grating resonator comprising the steps of coating an optical waveguide substrated with a photoresist layer, mechanically positioning and holding at least one sheet of high index medium in a plane substantialy perpendicular to said optical waveguide substrate, generating two coherent beams of radiation from a single source that are oriented with respect to each other such that an interference pattern can be created in a predetermined area of a predetermined spatial plane, mechanically positioning the integral structure including said optical waveguide substrate and said at least one sheet of high index medium such that said photoresist layer is in said predetermined spatial plane and said predetermined area is on both sides of said sheet of high index medium, developing said photoresist layer, and micromachining a grating in said optical waveguide in a pattern corresponding to said interference pattern.

7. A method as defined in claim 6 wherein the step of mechanically holding and positioning said at least one sheet of high index medium includes a step of gluing a block of optical fused quartz to opposite surfaces of a sheet of high index glass.

* * * * *